United States Patent
Soled et al.

(10) Patent No.: US 8,062,508 B2
(45) Date of Patent: Nov. 22, 2011

(54) HYDROPROCESSING USING BULK BIMETALLIC CATALYSTS

(75) Inventors: Stuart L. Soled, Pittstown, NJ (US);
Sabato Miseo, Pittstown, NJ (US);
Sonja Eijsbouts, Nieuwkuijk (NL);
Frans L. Plantenga, Hoevelaken (NL)

(73) Assignee: ExxonMobil Research and Engineering Company, Annandale, NJ (US)

( * ) Notice: Subject to any disclaimer, the term of this patent is extended or adjusted under 35 U.S.C. 154(b) by 434 days.

(21) Appl. No.: 11/586,398

(22) Filed: Oct. 25, 2006

(65) Prior Publication Data

US 2007/0090024 A1 Apr. 26, 2007

Related U.S. Application Data

(60) Provisional application No. 60/730,246, filed on Oct. 26, 2005.

(51) Int. Cl.
*C10G 45/00* (2006.01)
(52) U.S. Cl. .................... 208/209; 208/217; 208/216 R; 208/254 R; 208/254 H

(58) Field of Classification Search .................. 208/209, 208/217, 216 R, 254 R, 254 H
See application file for complete search history.

(56) References Cited

U.S. PATENT DOCUMENTS

| | | | |
|---|---|---|---|
| 4,596,785 A | 6/1986 | Toulhoat et al. | |
| 5,252,199 A | 10/1993 | Singhal et al. | |
| 2004/0182749 A1 * | 9/2004 | Domokos et al. | 208/213 |
| 2005/0040080 A1 | 2/2005 | Riley et al. | |

FOREIGN PATENT DOCUMENTS

| WO | WO 00/41810 | * | 7/2000 |
|---|---|---|---|
| WO | WO 2004/073859 A1 | | 9/2004 |

* cited by examiner

*Primary Examiner* — Tam M Nguyen
(74) *Attorney, Agent, or Firm* — David M. Weisberg; Bruce M. Bordelon

(57) ABSTRACT

The invention relates to a process for upgrading hydrocarbonaceous feedstreams by hydroprocessing using bulk bimetallic catalysts. More particularly, the invention relates to a catalytic hydrotreating process for the removal of sulfur and nitrogen from a hydrocarbon feed such as a fuel or a lubricating oil feed. The catalyst is a bulk catalyst containing a Group VIII metal and a Group VIB metal.

18 Claims, No Drawings

HYDROPROCESSING USING BULK BIMETALLIC CATALYSTS

This application claims the benefit of U.S. Provisional Application No. 60/730,246 filed Oct. 26, 2005.

FIELD OF THE INVENTION

The invention relates to a bulk catalyst comprising at least 60 wt. % metal oxidic particles comprising a Group VIII metal and Molybdenum. The invention further relates to a process for the manufacture of the bulk catalyst, to the corresponding sulfided bulk catalyst and to the use of said catalyst or sulfided catalyst in the hydroprocessing, in particular the hydrodesulfurization and hydrodenitrogenation, of a hydrocarbon feedstock.

BACKGROUND OF THE INVENTION

Increasing regulatory and operational pressure has resulted in the need for hydrocarbons that have low sulfur levels and nitrogen levels. Hydroprocessing, which involves treating a hydrocarbon with hydrogen in the presence of a catalyst, is a conventional method for heteroatom (e.g., sulfur and nitrogen) removal.

Conventional hydroprocessing (i.e., known to those skilled in the art of hydrocarbon upgrading) catalysts generally contain a Group VIB metal with one or more Group VIII metals on a refractory support. Hydrotreating catalysts that are particularly suitable for hydrodesulfurization, as well as hydrodenitrogenation, generally contain molybdenum or tungsten on alumina promoted with a metal such as cobalt, nickel, iron, or a combination thereof. Cobalt promoted molybdenum on alumina catalysts are most widely used when the limiting specifications are hydrodesulfurization, while nickel promoted molybdenum on alumina catalysts are the most widely used for hydrodenitrogenation, partial aromatic saturation, as well as hydrodesulfurization.

One example of the use of a supported bimetallic hydroprocessing catalysts is disclosed in GB 820536, which describes a process for the manufacture of mechanically strong supported catalyst particles comprising combinations of cobalt, nickel, molybdenum, vanadium or tungsten. The patent discloses a nickel tungsten supported catalyst obtained by extruding a wet cake comprising 83 wt. % support material and 17 wt. % of metals compounds followed by calcination at 566° C. Similarly, Russian patent publication RU 2114696 describes a nickel tungsten bimetallic supported catalyst made by mixing basic nickel carbonate, tungstic acid and more than 40 wt. % of a carrier material comprising a special carrier of dry alumina gel and aluminum hydroxide, extruding the mixture, drying and calcining at 350 to 450° C. In addition to supported catalysts, hydroprocessing using bulk bimetallic catalysts (also referred to as "unsupported" catalysts) is also known. However, their hydroprocessing performance is generally inferior to the bulk trimetallic catalysts comprising two instead of only one group VIB metals.

For example, PCT patent application WO 00/41810 discloses bulk bi- and tri-metallic hydroprocessing catalysts. Where the trimetallic bulk catalysts have a significantly higher catalytic activity than a bimetallic bulk catalyst prepared in a similar way in a comparison where the feed contained sulfur but no nitrogen. PCT patent application WO 99/03578 is similar in that a bulk trimetallic catalyst exhibits greater hydroprocessing effectiveness over a bulk bimetallic catalyst. Another example of a bulk trimetallic catalyst out-performing a similarly-prepared bimetallic catalyst is disclosed in PCT patent application WO 00/41811.

Recently, bimetallic bulk catalysts of reduced crystallinity have been described PCT patent application WO 2004/073859. The catalysts, bulk metal oxide catalysts comprising one or more metals of group VIII and one or more metals of group VIb in their oxide or sulphide form and a refractory oxide, are prepared by controlled precipitation of metal compounds, refractory oxide material and alkali compound (preferably ammonia) in a protic liquid, forming an ammonium complex of the metal and refractory oxide materials which is subsequently heated. Similarly, PCT patent application WO 2005/005582 describes the use of a bimetallic Group VIb/GROUP VIII catalyst to prepare lubricating base oil. The bulk catalysts are made by reacting one solid compound comprising the group VIII metal and one solute compound comprising the group VIB metal in the presence of the refractory metal after addition of ammonium solution. The catalyst is amorphous as described by X-ray diffraction ("XRD") analysis.

There is, therefore, still a need for bulk bimetallic hydroprocessing catalysts that are at least as effective for hydrocarbon hydroprocessing as bulk trimetallic catalysts.

SUMMARY OF THE INVENTION

In an embodiment, the invention relates to hydroprocessing a hydrocarbon feed by a process comprising contacting the feed with hydrogen in the presence of a catalytically effective amount of a bulk catalyst under catalytic conversion conditions, the catalyst comprising a Group VIII metal and a Group VIB metal, based on the weight of the catalyst, wherein the hydrocarbon feed contains both nitrogen and sulfur.

In a preferred embodiment, the catalyst has a metastable hexagonal phase characterized by an X-ray diffraction pattern having reflections between 33° and 35° as well as between 59° and 61°2θ (copper anode) with the reflections having a full width at half maximum of less than about 2.5°2θ.

In another embodiment, the process further comprises conducting a hydrocarbon product away from the process, the hydrocarbon product containing less nitrogen, less sulfur, or less sulfur and less nitrogen than the hydrocarbon feed. In a preferred embodiment, the feed is a hydrocarbon oil containing sulfur and nitrogen, and the hydrocarbon product contains less than 30 ppm sulphur, more preferably less than 10 ppm sulfur.

In another embodiment, the catalyst comprises at least 60 wt. % bulk catalyst particles.

The catalyst can optionally contain less than 10 mole % of a second Group VIB metal (relative to the total amount of Group VIB metals), and can optionally further contain less than 10 mole % (relative to the total of the Group VIB metals) of a Group V metal. Optionally, the catalyst further comprises a second Group VIII metal.

In an embodiment, the process further comprising forming a vapor product containing at least one of sulfur and nitrogen. In a related embodiment, the vapor product is separated from the hydrocarbon product and the vapor product is conducted away from the process.

In an embodiment, the catalytic conversion conditions are hydrotreating conditions effective for converting at least a portion of organically bound sulfur and organically bound nitrogen into hydrogen sulfide and ammonia respectively. In a related embodiment, the process further comprises at least one of (i) hydrocracking, and (ii) hydrogenating the hydrocarbon product.

In an embodiment, the hydrocarbon product is conducted away from the process for storage and/or further processing. For example, the liquid product, depending on product boiling range, is useful as (i) a fuel oil, such as a diesel oil or (ii) a lubricating oil such as a lubricating oil basestock.

DETAILED DESCRIPTION OF THE INSTANT INVENTION

The invention will be described as follows: a first section will describe catalytic hydroprocessing, a second section will describe the bulk bimetallic hydroprocessing catalyst, a third section will describe methods for making the bulk multimetallic catalyst, and a fourth section will contain examples.

Section I—Catalytic Hydroprocessing

The present invention involves hydroprocessing a hydrocarbon feed by a process comprising contacting the feed with hydrogen in the presence of a catalytically effective amount of a bulk catalyst under catalyst conversion conditions. The bulk catalyst comprising a Group VIII metal and a Group VIB metal. In an embodiment, the Group VIB metal component is selected from molybdenum, tungsten, and mixtures thereof; and the Group VIII metal component is selected from nickel, cobalt, iron, and mixtures thereof. The metal components (calculated as oxides) of the bulk metal catalysts comprise at least about 60 wt. % of the catalyst. In an embodiment, the catalyst is not amorphous, i.e., the catalyst exhibits at least some crystallinity as evidenced by X-Ray diffraction, for example.

It has been discovered that such a catalyst is effective for the removal of nitrogen and sulfur from a hydrocarbon feed, and is particularly effective for hydroprocessing feeds containing both nitrogen and sulfur. The contacting of the hydrocarbonaceous feedstream with the bulk metal hydroprocessing catalyst occurs in the presence of a hydrogen-containing treat gas, and the reaction stage is operated under effective hydroprocessing conditions. The contacting of the hydrocarbonaceous feedstream with the bulk metal hydroprocessing catalyst produces at least a liquid hydrocarbon product having less nitrogen, sulfur, or both compared to the feed.

The catalyst has a high hydrodesulfurization and hydrodenitrogenation activity, and is able to reach very low levels of residual sulfur in the product. It was surprisingly found that the catalyst has a very high hydrodesulfurization activity, which is close to or even better than comparable trimetallic catalysts, particularly in the presence of feed nitrogen. In view of the relatively low activities (as measured in the DBT test) of the nickel tungsten catalyst of comparative example B disclosed in PCT patent application WO 00/41810, it was surprising to find that a nickel-tungsten bulk catalyst made according to the process of the present invention has a very high activity and allows to reach very low sulfur levels in the hydroprocessing of a real nitrogen-containing and sulphur-containing feeds. Without wishing to be bound by any theory or model, it the catalyst of the invention appears to have a higher relative activity for nitrogen removal compared to its sulfur removal activity. The ultra-deep removal of nitrogen prevents the catalyst from poisoning by basic strongly adsorbing nitrogen compounds and prevents a reduction in desulfurization activity, which results in low product nitrogen and low product sulfur.

When the catalyst is a nickel-molybdenum catalyst, the bulk catalyst according to the invention has a particularly high activity for the hydrodenitrogenation of diesel (hereafter good and better in this context mean: a bulk catalyst with high or higher relative hydrodenitrogenation activity in comparison with a reference catalyst). Hydrodenitrogenation activity, especially when expressed per unit weight was found to be is very high when compared to the prior art trimetallic bulk catalyst. Even when compared on the basis of volume activity, the activity is still very good compared to the trimetallic bulk catalyst of the prior art. The bulk catalyst according to the invention is particularly useful for use in combination with a hydrodesulfurization catalyst. Therefore, the bulk catalyst of is useful in a process for the hydrodesulfurization and hydrodenitrogenation pre-treatment of a hydrocracking feed stream, or in a process for the manufacture of a lubricating base oil.

The hydrocarbon feed is a material comprising hydrogen and carbon that is obtained or derived from crude petroleum oil, from tar sands, from coal liquefaction, shale oil and hydrocarbon synthesis. Hydrocarbon feeds include feeds boiling from the naphtha boiling range to heavy feedstocks, such as gas oils and resids, and also those derived from Fischer-Tropsch processes. Typically, the feed boiling range will be from about 40° C. to about 1000° C. Non-limiting examples of suitable feedstreams include vacuum gas oils; distillates including naphtha, diesel, kerosene, and jet fuel; heavy gas oils, raffinates, lube oils, cycle oils, waxy oils, and the like.

Hydrocarbon feeds generally contain contaminants such as nitrogen and sulfur, often in organically-bound form. Feed nitrogen content can range from about 50 wppm to about 5000 wppm nitrogen, based on the weight of the feed, or about 75 wppm to about 800 wppm nitrogen, or about 100 wppm to about 700 wppm nitrogen. The nitrogen appears as both basic and non-basic nitrogen species. Examples of basic nitrogen species include quinolines and substituted quinolines, and examples of non-basic nitrogen species may include carbazoles and substituted carbazoles.

Feed sulfur content generally ranges from about 50 wppm to about 5 wppm based on the weight of the feed, or from about 100 wppm to about 5000 wppm, or from about 100 wppm to about 3000 wppm. Feeds subjected to prior processing such as separation, extraction, hydroprocessing, etc, may have significantly less sulfur, for example in the range of 75 wppm to 500 wppm. Feed sulfur will usually be present as organically bound sulfur. That is, as sulfur compounds such as simple aliphatic, naphthenic, and aromatic mercaptans, sulfides, di- and polysulfides and the like. Other organically bound sulfur compounds include the class of heterocyclic sulfur compounds such as thiophene, tetrahydrothiophene, benzothiophene and their higher homologs and analogs. The feed can also contain olefinic and aromatic hydrocarbon, with aromatics being typically present in an amount ranging from about 0.05 wt. %, to about 50 wt. %, based on the weight of the feed.

In an embodiment, the invention relates to contacting the feed with hydrogen in the presence of the catalyst under catalytic hydroprocessing conditions. The hydrogen may be in the form of a hydrogen-containing treat gas. The term "hydroprocessing" means a catalytic process conducted in the presence of hydrogen. The term includes processes such as the hydroconversion of heavy petroleum feedstocks to lower boiling products; the hydrocracking of distillate boiling range feedstocks; the hydrotreating of various petroleum feedstocks to remove heteroatoms, such as sulfur, nitrogen, and oxygen; the hydrogenation of unsaturated hydrocarbon; the hydroisomerization and/or catalytic dewaxing of waxes, particularly Fischer-Tropsch waxes; demetallation of heavy hydrocarbons, and ring-opening. Thus, "effective hydroprocessing conditions" are to be considered those conditions that when selected achieve the desired result of the hydroprocessing process. For example, effective hydroisomerization and/or catalytic dewaxing conditions are to be considered those conditions that, when selected, achieve the desired degree of dewaxing to produce the desired product.

In a preferred embodiment, the effective hydroprocessing conditions are effective hydrotreating conditions, i.e., conditions effective for at least one of (i) hydrogenation or (ii) hydrogenolysis. Generally, hydrotreating conditions will result in removing at least a portion of the heteroatoms in the feed and in hydrogenating at least a portion of the aromatics in the feed. Hydrotreating conditions typically include temperatures ranging from about 100° C. to about 450° C., preferably about 200° C. to about 370° C., more preferably about 230° C. to about 350° C. Typical weight hourly space velocities ("WHSV") range from about 0.05 to about 20 $hr^{-1}$, preferably from about 0.5 to about 5 $hr^{-1}$. Any effective pressure can be utilized, and pressures typically range from about 5 to about 250 bar. Hydrogen ($H_2$) to oil ratio generally ranges from about 5 to about 2000 NL/L. Process conditions may vary, as is known to those skilled in the art, depending on the feed boiling range and speciation. Generally, as the boiling point of the feed increases, the severity of the conditions will also increase. The following table serves to illustrate typical conditions for a range of feeds.

substantially bimetallic, that is substantially having only molybdenum as the Group VIB metal and also having only one Group VIII metal, preferably nickel. The catalyst may contain other metals. For example, the bulk catalyst may optionally further comprise less than about 10 mole % of a second Group VIB metal (relative to the total amount of Group VIB metals). The bulk catalyst may optionally further comprise a second Group VIII metal, for example Cobalt. It is most preferred that the bulk catalyst essentially comprises only nickel and molybdenum. The bulk catalyst may optionally further comprise less than about 10 mole % of a Group V metal (relative to the total of the Group VIB metals), which differs from the amount of Group V metal disclosed in prior art bulk catalysts, which contain a Group V metal in amounts generally between about 10 and 9 about 0 mole % (relative to the total of the Group VIB metals). In a special embodiment, the bulk catalyst comprises a Group V metal, preferably Niobium, in an amount between 0.1 and 10 mole % (relative to the total of the Group VIB metals), more preferably between 0.1 and 7 mole % and even more preferably between 0.1 and 5 mole %. The Group V metal was found to increase the activity even when present in relatively low amounts.

In the bulk catalyst according to the invention, the Group VIII to Group VIB metal molar ratio (hereafter referred to as the metal molar ratio), in particular nickel to molybdenum

| FEED | TYPICAL BOILING RANGE ° C. | TEMP. ° C. | PRESS, BAR | SPACE VELOCITY V/V/HR | $H_2$ GAS RATE SCF/B |
|---|---|---|---|---|---|
| Naphtha | 25-210 | 100-370 | 10-60 | 0.5-10 | 100-2,000 |
| Diesel | 170-350 | 200-400 | 15-110 | 0.5-4 | 500-6,000 |
| Heavy Gas Ooil | 325-475 | 260-430 | 15-170 | 0.3-2 | 1000-6,000 |
| Lube Oil | 290-550 | 200-450 | 6-210 | 0.2-5 | 100-10,000 |
| Resid | 10-50% > 575 | 340-450 | 65-1100 | 0.1-1 | 2,000-10,000 |

The process uses hydrogen or a hydrogen-containing treat gas. Treat gas can comprise substantially pure hydrogen or can be mixtures of other components typically found in refinery hydrogen streams. It is preferred that the treat gas contain little, more preferably no, hydrogen sulfide. The treat gas purity should be at least about 50% by volume hydrogen, preferably at least about 75% by volume hydrogen, and more preferably at least about 90% by volume hydrogen. The treat gas can be pure or substantially pure hydrogen.

The hydroprocessing occurs in a reaction stage. The reaction stage can comprise one or more reactors or reaction zones each of which comprises one or more catalyst beds of the same or different catalyst. At least one bed will contain the bulk bimetallic catalyst. Although other types of catalyst beds/reactors can be used, fixed beds are preferred. Such other types of catalyst beds include fluidized beds, ebullating beds, slurry beds, and moving beds. Interstage cooling or heating between reactors, reaction zones, or between catalyst beds in the same reactor, can be employed. A portion of the heat generated during hydroprocessing can be recovered. Where this heat recovery option is not available, conventional cooling may be performed through cooling utilities such as cooling water or air, or through use of a hydrogen quench stream. In this manner, optimum reaction temperatures can be more easily maintained.

Section II—Bulk Bimetallic Catalysts

The hydroprocessing catalyst is a non-amorphous, bulk multimetallic catalyst. In an embodiment, the bulk catalyst is molar ratio, can in principle vary between wide ranges, for example between about 0.2 and about 5. Generally good results can be obtained with a metal molar ratio between about 0.2 and about 4. However, it was observed that at a low Ni/Mo ratio, typically between about 0.2 and about 1.5, very often the hexagonal metastable structure was not obtained and/or the full width at half maximum ("FWHM") of the metastable hexagonal phase reflections was more than about 2.5°. In this metal molar ration the X-Ray diffraction ("XRD") pattern showed a large number of peaks, possibly due to some raw materials still present but mainly to crystal structures of unidentified inactive compounds. It was also observed that in this Ni/Mo metal molar ratio range the activity was significantly lower. The lower boundary of the metal molar ratio may depend on specific process conditions used, but it is generally preferred that the Group VIII to Group VIB metal molar ratio, in particular the nickel molybdenum molar ratio is above about 1.5, more preferably above about 2, even more preferably above about 2.5 and most preferably above about 3.

It was further found that at low metal molar ratio it can be difficult to obtain a good catalyst in the standard atmospheric reaction conditions as described above. However, it was possible to obtain a good catalyst in a hydrothermal process wherein the protic liquid is water and the reaction is done in hydrothermal conditions at a reaction temperature above about 100° C. and at a reaction pressure higher than about 1 bar. Consequently, in an embodiment, the bulk catalyst has nickel to molybdenum molar ratio between about 0.2 and about 5 obtainable by this hydrothermal process.

In an embodiment, the protic liquid is water. However, other protic liquids are not excluded, and therefore the term "hydrothermal reaction conditions" in this context is intended to also cover reaction conditions using a protic liquid other than water, at a pressure above atmospheric pressure, and at temperatures above the boiling temperature of the protic liquid. The hydrothermal reaction is preferably done in water as the protic liquid in an autoclave under autogenic elevated pressure and temperatures between about 110° C. and about 170° C., more preferably between about 120° C. and about 160° C., even more preferably between about 140 and about 160° C. Preferably, in view of achieving a high activity in these hydrothermal conditions the group VIII to Group VIB metal molar ratio is more than about 0.3, preferably more than about 0.4, more preferably more than about 0.5, even more preferably more than about 0.6 and most preferably more than about 0.7.

The bulk catalyst comprises at least about 60 wt. % of metal oxidic particles (wt. % calculated on the basis of metal oxides relative to the total weight of the bulk catalyst) as distinguished from supported catalysts that have metal oxides deposited on a support material in amounts significantly less than about 60 wt. %. In an embodiment, the bulk catalyst comprises at least about 70 wt. %, more preferably at least about 75 wt. %, even more preferably at least about 80 wt. % and most preferably at least about 85 wt. % metal oxidic particles, the remaining about 0 to about 40 wt. % being one or more materials selected from the group of binder materials, conventional hydroprocessing catalysts and cracking component. Typically, after compositing of the metal oxidic particles with a binder, the composition is shaped, preferably extruded, to form shaped bulk catalyst particles. The invention also relates to shaped bulk catalyst particles comprising the metal oxidic particles.

In an embodiment, the bulk catalyst comprises a Group V metal, preferably Niobium, in an amount between about 0.1 and about 10 mole % (relative to the total of the Group VIB metals), more preferably between about 0.1 and about 7 mole % and even more preferably between about 0.1 and about 5 mole %. The group V metal was found to increase the activity even when present in relatively low amounts.

In the bulk catalyst according to the invention, the Group VIII to Group VIB metal molar ratio (hereafter referred to as the metal molar ratio), in particular nickel to molybdenum molar ratio, can in principle vary between wide ranges, for example between about 0.2 and about 5. Generally good results can be obtained with a metal molar ratio between about 0.2 and about 4. However, it was observed that at a low Ni/Mo ratio, typically between about 0.2 and about 1.5, very often the hexagonal metastable structure was not obtained and/or the FWHM (of the metastable hexagonal phase reflections) was more than about 2.5° 2θ. In this metal molar ratio the XRD pattern showed a large number of peaks, possibly due to some raw materials still present but mainly to crystal structures of unidentified inactive compounds. It was also observed that in this Ni/Mo metal molar ratio range the activity was significantly lower. The lower boundary of the metal molar ratio may depend on specific process conditions used, but it is generally preferred that the Group VIII to Group VIB metal molar ratio, in particular the nickel molybdenum molar ratio is above about 1.5, more preferably above 2, even more preferably above about 2.5 and most preferably above about 3.

It was further found that, where at low metal molar ratio it appeared difficult if not impossible to obtain a good catalyst in the standard atmospheric reaction conditions as described above, it was possible to obtain a good catalyst in a hydrothermal process wherein the protic liquid is water and the reaction is done in hydrothermal conditions at a reaction temperature above about 100° C. and at a reaction pressure higher than about 1 bar. The invention also relates to a bulk catalyst having nickel to molybdenum molar ratio between about 0.2 and about 5 made by a hydrothermal process.

In view of the teachings of the prior art, it was surprising to find that high catalytic activity of the bulk catalyst of the invention could be found in a catalyst that is not amorphous, but instead has distinct crystallographic features. In an embodiment, the bulk catalyst has a metastable hexagonal structure having an X-ray diffraction pattern showing two reasonably well-resolved reflections, one between about 33° and about 35° two theta, the other between about 59° and about 61° two theta. The presence of the metastable hexagonal phase appeared to be indicative of a high catalytic activity. As opposed to the prior art catalyst it is preferred that the bulk catalyst according to invention has an XRD pattern wherein the main reflections have a full width at half maximum (FWHM) of less than 2.5° two theta. An FWHM of less than about 2.0° or even less than about 1.5° is often observed. In an embodiment, the bulk catalyst contains a metastable hexagonal phase and an amorphous phase.

It was found that the metal oxidic particles in the bulk catalyst according to the invention can be sensitive to heat treatment. The bulk catalyst, in particular the metal oxidic particles in the bulk catalyst, should be heat treated at a temperature below a temperature where transition to a crystalline structure other than the desired metastable hexagonal phase. This applies to any and all heat treatment steps in the production process of the bulk catalyst. This applies in particular also to heat treatment of shaped bulk catalyst particles after compositing and shaping. Preferably, the bulk catalyst is heat treated below about 450° C., more preferably below about 400° C., even more preferably below about 375° C. and most preferably below about 350° C. This applies also to drying and calcination.

Section III—Making Bulk Bimetallic Catalysts

In the first step of the process for preparing the bulk catalyst, the reaction compounds are combined to form a reaction mixture. This can be done for example in accordance with conventional processes described in WO 00/41810, WO 99/03578, WO 2004/073859, WO 2005/005582 and WO 00/41811. The first and/or second compounds can be soluble or at least partly insoluble in the protic liquid. It is possible to first prepare a suspension or solution of a metal compound in the protic liquid and to add, simultaneously or one after the other, solution(s) and/or further suspension(s) comprising dissolved and/or suspended metal compound(s) in the protic liquid. It is also possible to first combine solutions either simultaneously or one after the other and to subsequently add further suspension(s) and optionally solution(s) either simultaneously or one after the other.

However, in a preferred embodiment the process for the manufacture of the bulk catalyst according to the invention comprises i) preparing a reaction mixture of a first metal compound comprising Group VIII metal and a second metal compound comprising molybdenum, optionally comprising a further compound comprising a second Group VIB metal in an amount less than 10 mole % (relative to the total amount of Group VIB metals) and optionally a compound comprising a Group V metal compound in an amount less than about 10 mole % (relative to the total of the Group VIB metals) and optionally a compound comprising a second Group VIII metal compound in a protic liquid, and ii) reacting the first and second metal compounds at elevated temperature whereby the first and/or the second solid metal compounds remain at least partly in the solid state during the entire reaction to form the metal oxidic particles, wherein the bulk catalyst in all stages during its preparation remains at a temperature below a temperature where the hexagonal metastable crystal structure changes to an inactive crystalline structure, preferably below about 400° C.

Preferably, in this process, the first metal compound and the second metal compound remain at least partly in the solid state during the entire reaction. This preferred process is referred to as the solid-solid process. This process is relatively simple, has a high yield and is environmentally friendly, but most importantly the bulk catalyst obtainable by said process was found be highly active. The term "at least partly in the solid state" means that at least part of the metal compound is present as a solid metal compound and, optionally, another part of the metal compound is present as a solution of this metal compound in the protic liquid. This solid-solid process is described in detail in WO 00/41810 as one of several possible preparation routes to prepare trimetallic bulk catalyst.

Preferably, in view of achieving a high yield, the first and second solid metal compounds are free from nitrogen atoms and wherein the protic liquid separated from the reacted metal oxidic particles is re-used at least in part to form the slurry in step i). Most preferably, in this process the first metal compound is a metal (hydroxy) carbonate and the second metal compound is a metal oxide or acid. In view of obtaining a highly catalyst it is further preferred that in the process the first compound is a Nickel carbonate or hydroxy carbonate having a surface area of at least about 150 m²/g.

The process is an economically optimal catalyst production process. Apart from the fact that the metal compounds can be free of nitrogen atoms, the reaction also does not require addition of ammonia to the reaction mixture, as for example in WO 2004/073859, so the process can be entirely free of undesirable nitrogen atoms. Consequently, there is minimal if any accumulation of alien ions like ammonium and/or nitrate in the protic liquid on repeated recycling, and there is little or no need for washing the obtained separated oxidic particles. Moreover, there is a reduced loss of heavy transition metals, and there is a reduced risk of ammonium nitrate salt formation. Further, because the catalyst is bimetallic, the chemistry in the reaction step is simpler, as there is only one Group VIB metal there can be no composition drift in the Group VIB metals on recycling of the separated liquid after reaction. Because the compounds remain at least partly solid during the entire reaction the amount of metals dissolved in the protic liquid is small and hence losses are smaller. Furthermore, the spent bimetallic catalyst is easier to recycle to the constituent metals than the trimetallic catalyst because there is no need to separate two group VIB metals, which is very difficult. Conventional processes for the separation of nickel and molybdenum can be used. This is advantageous in terms of reduced recycling process complexity, costs and increased metal recovery yield.

In an alternative embodiment, the manufacture of the bulk catalyst is prepared in a process comprising:
(i) forming a solution of a first soluble metal compound comprising Group VIII metal and a second soluble metal compound comprising molybdenum, the solution optionally further comprising a further compound comprising a second Group VIB metal in an amount less than 10 mole % (relative to the total amount of Group VIB metals) and optionally a compound comprising a Group V metal compound in an amount less than 10 mole % (relative to the total of the Group VIB metals) and optionally a second Group VIII compound, and
(ii) reacting and/or precipitating the first and second metal compounds to form the metal oxidic particles, wherein the bulk catalyst in all stages during its preparation remains at a temperature below a temperature where the hexagonal metastable crystal structure changes to an inactive crystalline structure, preferably below about 400° C. In this embodiment, it is preferred that the first and second solid metal compounds are free from nitrogen atoms and the protic liquid separated from the reacted metal oxidic particles is re-used at least in part to form the reaction mixture in step i).

The reaction time is chosen sufficiently long to substantially complete the reaction. The reaction is complete when the x-ray diffraction pattern of the separated metal oxidic particles does not show reflections of the unreacted starting compounds. In any case, the reaction time is chosen such that the final bulk catalyst after drying, shaping and calcining does not show reflections of the unreacted starting compounds. Typically, the reaction is carried out for a time of at least about 2 hours, preferably at least about 4 hours, more preferably at least about 6 hours and most preferably at least about 8 hours. A particular advantage of the hydrothermal reaction process is that reaction speed of the metal compounds is higher or reversely that in principle a higher yield can be obtained within the same reaction time. This is advantageous especially when a low Group VIII to Group VI metal molar ratio is wanted because a low metal ratio was found to reduce the reaction speed during the preparation.

The process further optionally comprises one or more of the following conventional (i.e., known to those skilled in the art of hydroprocessing catalysts and processes) process steps:
(iii) separating the metal oxidic particles from the reaction mixture,
(iv) compositing the metal oxidic particles with 0 to 40 wt. % of one or more materials selected from the group of binder materials, conventional hydroprocessing catalysts, acidic promoters and cracking compounds before, during or after the combining and/or reacting of the metal compounds,
(v) spray-drying, (flash) drying, milling, kneading, slurry-mixing, dry or wet mixing, or combinations thereof,
(vi) shaping, and drying and/or thermally treating at a temperature below a temperature where transition to a crystalline structure occurs, preferably below about 400° C., and
(vii) sulfiding.

In an embodiment, the bulk catalyst is a sulfided bulk catalyst. Any catalyst sulfiding method can be used to sulfide the bulk catalyst, including conventional methods. The bulk catalyst or the sulfided bulk catalyst is useful the for hydroprocessing of a hydrocarbon feedstock comprising sulphur and nitrogen containing organic compounds and to a method for ultra deep hydrodesulfurization of a sulphur and nitrogen containing hydrocarbon feed comprising contacting the feed with the sulfided or unsulfided bulk catalyst according to the invention. The bulk catalyst according to the invention is particularly useful for use in combination with a very good hydrodesulfurization catalyst. The high hydrodenitrogenation activity and ultra low residual nitrogen levels allow a hydrodesulfurization catalyst to achieve lower residual sulphur levels. The residual nitrogen level, that is the amount of nitrogen (in wppm) after the hydrotreatment using the catalyst, is below about 10, preferably below about 5, more preferably below about 2, even more preferably below 1 wppm.

Characteristic Full Width at Half Maximum

The characteristic full width at half maximum FWHM of the oxidic catalysts was determined on the basis of the X-ray diffraction pattern of the catalyst: the characteristic full width at half maximum is the full width at half maximum (in terms of 2θ scattering angle) of the reflections between 33° and 35° as well as the one between about 59° and about 61°2θ. For the determination of the X-ray diffraction pattern, a standard powder diffractometer equipped with a graphite monochromator can be used. The measurement conditions can, e.g., be chosen as follows: X-ray generator settings: 40 kV and 40 mA; wavelength: 1.5418 angstroms; divergence and anti-scatter slits v20 (variable); detector slit: 0.6 mm, step size: 0.05 (°2θ); and time/step=2 seconds.

Section IV

EXAMPLES

The invention will be further illustrated by the Examples described below. R3 means a reaction process wherein both the first and second metal compounds are at least partly solid during the reaction. R2 means a reaction route wherein at least one of the first or second metal compounds is at least partly solid during the reaction and the other compounds are is dissolved. CBD means compacted bulk density of the catalyst. HT means hydrothermal reaction condition. The diesel hydroprocessing test results are given in Table 7 wherein RVA and RWA are relative volume activity and relative weight activity, respectively, based on the total catalyst amount loaded in the reactor. HDN is hydrodenitrogenation and HDS is hydrodesulphurisation. The tests were performed using two different temperature and pressure conditions 1 and 2. The postfix 1 or 2 (for example in RWA1 and RWA2) refer to the test conditions 1 and 2 respectively. The RWA HDN1 results are not shown because the nitrogen levels in the reaction product were all so low that the measurement is inaccurate and differences between the samples are too small to identify differences in catalytic activity between samples. Further, the residual nitrogen and sulphur levels after the hydrotreatment were determined and given in Table 7 under column S1, S2 and N2. In the tests different diesel test procedures were used indicated as D1, D2 and D3. The RWA/RVA values of the reference catalysts C1 in D1, D2 and D3 were defined as 100. All other RWA/RVA values are calculated relative to these reference catalysts. Results for different catalysts cannot be compared when tested with different diesel test procedures.

Comparative Experiment 1 (C1: Ni1.5Mo0.5W0.5 R3 Extrudate)

14.4 g of $MoO_3$ (0.1 mole Mo, ex. Aldrich) and 25.0 g of tungstic acid $H_2WO_4$ (0.1 mole W, ex. Aldrich) were slurried in 800 ml of water (suspension A) and heated to 90° C. 35.3 g of nickel hydroxycarbonate $2NiCO_3*3Ni(OH)_2*4 H_2O$ (0.3 mole of Ni, ex. Aldrich) were suspended in 200 ml of water and heated to 90° C. (suspension B). The nickel hydroxycarbonate used in this and the other examples had a B.E.T. surface area of 239 m$^2$/g. Suspension B was added to suspension A in 60 minutes, and the resulting mixture was maintained at 90° C. for a period of 16 hours (overnight) with continuous stirring. At the end of this time, the suspension was filtered. The yield was above 98% (based on the calculated weight of all metal components having been converted to their oxides). The obtained filter cake was wet-mixed with 2.5 wt. % of a binder (based on the total weight of the catalyst composition). The water content of the mixture was adjusted in order to obtain an extrudable mix, and the mixture was subsequently extruded. The resulting solid was dried at 120° C. for 16 hours (overnight) and calcined at 300° C. for 1 hour. The catalyst was sulfided and tested using the procedure from Diesel test procedures 2.

Comparative Experiment 2 (C2: Ni1.5Mo0.5W0.5 R3 Crushed)

The extrudate catalyst of C1 was crushed and 40-60 mesh fraction was isolated by sieving. The material was then sulfided as described in C1 and tested using the Diesel test procedure 3.

Comparative Experiment 3 (C1: Ni1.5Mo0.5W0.5 R3 Extrudate & Crushed)

The extrudate catalyst of C1 was sulfided and tested using the procedure from Diesel test procedures 1.

Example 1

E1: Ni1.5Mo1 R2 Extrudate 35.3 g of ammonium heptamolybdate $(NH_4)_6Mo_7O_{24}*4H_2O$ (0.2 mole Mo, ex. Aldrich) were dissolved in 800 ml water, giving a solution with a pH of about 5.2 at room temperature. The solution was subsequently heated to 90° C. (solution A). 35.3 g of nickel hydroxycarbonate $2NiCO_3*3Ni(OH)_2*4H_2O$ (0.3 mole Ni, ex. Aldrich) were suspended in 200 ml of water, and this suspension was heated to 90° C. (suspension B). Then suspension B was added to solution A in 10 minutes, and the resulting suspension was maintained at 90° C. for a period of 16 hours with continuous stirring. The yield was about 8%. The obtained filter cake was extruded (with 10 wt. % binder), dried, calcined and sulfided as described in C1 and tested using the procedure from Diesel test procedure 2.

Example 2

E2: Ni3Mo1 R3 Extrudate

A catalyst was prepared as described in Comparative Experiment 1 (C1), except that only one Group VIB metal component was applied: a catalyst was prepared using 28.8 g of molybdenum trioxide (0.2 mole Mo, ex. Aldrich) and 70.6 g of nickel hydroxycarbonate $2NiCO_3*3Ni(OH)_2*4 H_2O$ (0.6 mole Ni). The yield was about 98%, based on the calculated weight of all metal components having been converted to their oxides. The obtained filter cake was extruded (with 10 wt. % binder), dried, calcined and sulfided as described in C1 and tested using the Diesel test procedure 2.

Example 3

E3: Ni2Mo1 Powder R3

A catalyst was prepared as described in Comparative Experiment 1 (C1), except that only one Group VIB metal component was applied: a catalyst was prepared using 28.8 g of molybdenum trioxide (0.2 mole Mo, ex. Aldrich) and 47.1 g of nickel hydroxycarbonate $2NiCO_3*3Ni(OH)_2*4 H_2O$ (0.4 mole Ni). The yield was about 98%, based on the calculated weight of all metal components having been converted to their oxides. The resulting solid was dried at 120° C. for 16 hours (overnight) and calcined at 300° C. for 1 hour. The obtained material was pelleted, the pellets were crushed and 40-60 mesh fraction was isolated by sieving. The material was then sulfided as described in C1 and tested using the Diesel test procedure 3.

Example 4

E4: Ni3Mo1 Powder R3

A catalyst was prepared as described in Comparative Experiment 1 (C1), except that only one Group VIB metal component was applied: a catalyst was prepared using 28.8 g of molybdenum trioxide (0.2 mole Mo, ex. Aldrich) and 70.6 g of nickel hydroxycarbonate $2NiCO_3 \cdot 3Ni(OH)_2 \cdot 4 H_2O$ (0.6 mole Ni). The yield was about 98%, based on the calculated weight of all metal components having been converted to their oxides. The resulting solid was dried at 120° C. for 16 hours (overnight) and calcined at 300° C. for 1 hour. The obtained material was pelleted, the pellets were crushed and 40-60 mesh fraction was isolated by sieving. The material was then sulfided as described in C1 and tested using the Diesel test procedure 3.

Example 5

E5: Ni1.5Mo1 R3 Extrudate

A catalyst was prepared as described in Comparative Experiment 1 (C1), except that only one Group VIB metal component was applied: a catalyst was prepared using 28.8 g of molybdenum trioxide (0.2 mole Mo, ex. Aldrich) and 35.3 g of nickel hydroxycarbonate $2NiCO_3 \cdot 3Ni(OH)_2 \cdot 4 H_2O$ (0.3 mole Ni). The yield was about 98%, based on the calculated weight of all metal components having been converted to their oxides. The obtained filter cake was extruded (with 2.5 wt. % binder), dried, calcined and sulfided as described in C1 and tested using the Diesel test procedure 1.

Diesel Test Procedure D1

The catalysts were tested in a down-flow tubular reactor. Each reactor tube contained 10 ml of catalyst mixed with an equal amount of SiC particles and sandwiched between layers of SiC particles. Before being tested the catalysts were presulfided via liquid phase presulfiding using the feed described in Table 1, which had been spiked with dimethyl disulfide to a total sulfur content of 3.7 wt. %. The presulfided catalysts were then tested in the hydrotreating of a diesel feedstock having the properties shown in Table 1:

TABLE 1

|  | GAS OIL FEEDSTOCK |
| --- | --- |
| Sulphur content (% wt) | 1.24 |
| Nitrogen content (wppmt) | 86 |
| Mono aromatics (% wt) | 16.5 |
| Di-aromatics (% wt) | 10.8 |
| Di+-aromatics (% wt) | 0.8 |
| Total aromatics (% wt) | 28.1 |
| Simulated Distillation ASTM-D 86 | |
| Initial Boiling Point | 184 |
| 5% Volume (° C.) | 218.6 |
| 10% Volume (° C.) | 231.1 |
| 20% Volume (° C.) | 250.9 |
| 30% Volume (° C.) | 264.8 |
| 40% Volume (° C.) | 276.4 |
| 50% Volume (° C.) | 286.8 |
| 60% Volume (° C.) | 298.1 |
| 70% Volume (° C.) | 309.7 |
| 80% Volume (° C.) | 324.7 |
| 90% Volume (° C.) | 345.3 |
| 95% Volume (° C.) | 360.3 |
| Final Boiling Point (° C.) | 373.8 |

The catalysts were tested under the two conditions shown in Table 2.

TABLE 2

|  | Presulfiding | Condition 1 | Condition 2 |
| --- | --- | --- | --- |
| Temperature (° C.) | 315 | 320 | 340 |
| Pressure (bar) | 30 | 40 | 20 |
| $H_2$ to oil ratio (Nl/l) | 200 | 300 | 300 |
| LHSV (1/h) | 3.0 | 2.0 | 1.5 |

Diesel Test Procedure D2

The catalyst was loaded into the reactor in a manner analogous to what is described in D1. Before being tested the catalysts were presulfided via liquid phase presulfiding using the feed described below in Table 3, which had been spiked with dimethyl disulfide to a total sulfur content of 3.7 wt. %. The presulfided catalysts were then tested in the hydrotreating of a diesel feedstock having the properties shown in Table 3.

TABLE 3

|  | GAS OIL FEEDSTOCK |
| --- | --- |
| Sulphur content (% wt) | 1.23 |
| Nitrogen content (wppmt) | 85 |
| Mono aromatics (% wt) | 16.6 |
| Di-aromatics (% wt) | 11.1 |
| Di+-aromatics (% wt) | 0.7 |
| Total aromatics (% wt) | 28.4 |
| Simulated Distillation ASTM-D 86 | |
| Initial Boiling Point | 180 |
| 5% Volume (° C.) | 220 |
| 10% Volume (° C.) | 233 |
| 20% Volume (° C.) | 250 |
| 30% Volume (° C.) | 262 |
| 40% Volume (° C.) | 273 |
| 50% Volume (° C.) | 284 |
| 60% Volume (° C.) | 295 |
| 70% Volume (° C.) | 307 |
| 80% Volume (° C.) | 321 |
| 90% Volume (° C.) | 341 |
| 95% Volume (° C.) | 345 |
| Final Boiling Point (° C.) | 354 |

The catalysts were tested under the two conditions shown in Table 4.

TABLE 4

|  | Presulphiding | Condition 1 | Condition 2 |
| --- | --- | --- | --- |
| Temperature (° C.) | 315 | 315 | 340 |
| Pressure (bar) | 45 | 45 | 20 |
| $H_2$ to oil ratio (Nl/l) | 200 | 200 | 200 |
| LHSV (1/h) | 3.0 | 1.5 | 1.5 |

Diesel Test Procedure D3

The catalyst was loaded into the reactor in a manner analogous to what is described in D1. Before being tested the catalysts were presulfided via liquid phase presulfiding using the feed described below in Table 5, which had been spiked with dimethyl disulfide to a total sulfur content of 3.7 wt. %. The presulfided catalysts were then tested in the hydrotreating of a diesel feedstock having the properties shown in Table 5.

TABLE 5

GAS OIL FEEDSTOCK

| | |
|---|---|
| S (wt. %) | 1.2 |
| N (wppmt) | 84 |
| total aromatics (wt. %) | 27.8 |
| polynuclear aromatic (PNA) (wt. %) | 11.7 |
| mono-aromatics (wt. %) | 16.5 |
| di-aromatics (wt. %) | 10.8 |
| tri+-aromatics (wt. %) | 0.8 |

TABLE 5-continued

GAS OIL FEEDSTOCK

| Simulated distillation ASTM-D 86 | |
|---|---|
| Initial boiling point | 184° C. |
| 5 vol. % | 218° C. |
| 10 vol. % | 231° C. |
| 30 vol. % | 265° C. |
| 50 vol. % | 287° C. |
| 70 vol. % | 310° C. |
| 90 vol. % | 345° C. |
| Final boiling point | 374° C. |

The catalysts were tested under the two conditions shown in Table 6.

TABLE 6

| | Presulfiding | Condition 1 | Condition 2 |
|---|---|---|---|
| Temperature (° C.) | 320 | 330 | 340 |
| Pressure (bar) | 40 | 40 | 20 |
| H₂ to oil ratio (Nl/l) | 300 | 300 | 300 |
| LHSV (1/h) | 3.00 | 1.50 | 1.50 |

The full width at half maximum (FWHM) was measured for all examples and was found to be below 2.5 in all examples. The results in Table 7 show that the catalyst according to the invention achieves very low residual nitrogen levels. Hydrodenitrogenation activity, especially when expressed per unit weight is very high when compared to the prior art trimetallic bulk catalyst. Even when compared on the basis of volume activity, the activity is still very good compared to the trimetallic bulk catalyst of the prior art. A comparison of condition 1 and 2 shows that significantly better results in hydrodenitrogenation are obtained at higher pressures. The hydrodesulfurization activity is relatively low but acceptable. The bulk catalyst according to the invention is particularly useful for use in combination with a very good hydrodesulfurization catalyst. The high hydrodenitrogenation activity and ultra low residual nitrogen levels allow a hydrodesulfurization catalyst to achieve much lower residual sulfur levels.

TABLE 7

TEST RESULTS

| Exp. No. | Catalyst | Test Powder | Test Extrudates | CBD Loaded | N1 | RWA HDN1 | RVA HDN1 | N2 | RWA HDN2 |
|---|---|---|---|---|---|---|---|---|---|
| C1 | Ni1.5Mo0.5W0.5R3 | | D2 | 1.39 | 0.4 | 100 | 100 | 2 | 100 |
| E1 | Ni1.5Mo1R2 | | D2 | 0.96 | 0.5 | 148 | 97 | 10 | 93 |
| E2 | Ni3Mo1R3-PEG | | D2 | 0.94 | 0.6 | 146 | 94 | 12 | 85 |
| E3 | Ni2Mo1R3 | D3 | | 0.93 | 0.5 | 147 | 96 | 13 | 80 |
| E4 | Ni3Mo1R3 | D3 | | 0.93 | 0.4 | 154 | 100 | 14 | 77 |
| C2 | Ni1.5Mo0.5W0.5R3crush | D3 | | 1.43 | 19 | 100 | 100 | 2 | 100 |
| E5 | Ni1.5Mo1R3 | | D1 | 0.77 | 0.6 | 169 | 93 | 13.1 | 104 |
| C3 | Ni1.5Mo0.5W0.5R3 | | D1 | 1.39 | 0.4 | 100 | 100 | 3.4 | 100 |

| Exp. No. | Catalyst | RVA HDN2 | S1 | RWA HDS1 | RVA HDS1 | S2 | RWA HDS2 | RVA HDS2 |
|---|---|---|---|---|---|---|---|---|
| C1 | Ni1.5Mo0.5W0.5R3 | 100 | 23 | 100 | 100 | 24 | 100 | 100 |
| E1 | Ni1.5Mo1R2 | 61 | 247 | 51 | 33 | 131 | 71 | 46 |
| E2 | Ni3Mo1R3-PEG | 54 | 531 | 35 | 22 | 146 | 69 | 44 |
| E3 | Ni2Mo1R3 | 52 | 31 | 63 | 41 | 167 | 57 | 37 |
| E4 | Ni3Mo1R3 | 50 | 17 | 82 | 53 | 166 | 57 | 37 |
| C2 | Ni1.5Mo0.5W0.5R3crush | 100 | 4 | 100 | 100 | 0.4 | 100 | 100 |
| E5 | Ni1.5Mo1R3 | 58 | 160 | 59 | 33 | 132 | 82 | 45 |
| C3 | Ni1.5Mo0.5W0.5R3 | 100 | 13 | 100 | 100 | 23 | 100 | 100 |

What is claimed is:

1. A process of hydroprocessing a hydrocarbon feed comprising contacting the feed with hydrogen in the presence of a catalytically effective amount of a bimetallic bulk catalyst under catalytic conversion conditions including a pressure from about 5 bar to about 250 bar to form a hydrocarbon product, the two metals of the bimetallic bulk catalyst consisting of a Group VIII metal being nickel and a Group VIB metal being molbdenum or tungsten, wherein the bimetallic bulk catalyst is not amorphous, wherein the feed contains both sulfur and nitrogen, wherein the catalyst comprises at least about 85 wt % metal oxidic particles relative to the total weight of the bulk catalyst, with the remainder comprising one or more materials selected from the group of binder materials, conventional hydroprocessing catalysts, and cracking compounds, and wherein the bimetallic bulk catalyst has a relative weight activity at a pressure of 40 bar or above that is greater than an activity of a trimetallic bulk catalyst whose three metals consist of nickel, molybdenum, and tungsten at identical catalytic conversion conditions.

2. The process according to claim 1, wherein the bulk catalyst comprises nickel molybdenum oxidic bulk catalyst particles made by a process comprising:
  (i) forming a slurry of a first solid metal compound comprising nickel and a second solid metal compound comprising molybdenum in a protic liquid,
  (ii) reacting the first and second solid metal compounds at elevated temperature whereby the first and second solid metal compounds remain at least partly in the solid state during the entire reaction to form the nickel molybdenum oxidic bulk catalyst, (iii) separating the oxidic bulk catalyst particles from the slurry, and (iv) heat treating the oxidic bulk catalyst particles at a temperature between 250 and 450° C. to form the bulk catalyst, which bulk catalyst has a metastable hexagonal phase characterized by an X-ray diffraction pattern having reasonably well resolved reflections at 33° to 35° and 59° to 61° 2θ.

3. The process according to claim 1, wherein the bulk catalyst comprises nickel tungsten oxidic bulk catalyst particles obtained by a process comprising:

(v) forming a solution of a first soluble metal compound comprising nickel and a second soluble metal compound comprising tungsten, (vi) reacting and/or precipitating the first and second metal compounds whereby to form the nickel tungsten oxidic bulk catalyst, (vii) separating the oxidic bulk catalyst particles from step (vi), and (viii) heat treating the oxidic bulk catalyst particles at a temperature between 250 and 450° C. to form the bulk catalyst, which bulk catalyst has a metastable hexagonal phase characterized by an X-ray diffraction pattern having reasonably well resolved reflections at 33° to 35° and 59° to 61° 2θ.

4. The process according to claim 1, wherein the bulk catalyst has a Group VIII to Group VIB metal mole ratio more than 1.

5. The process according to claim 1, wherein the bulk catalyst has a Group VIII to Group VIB metal mole ratio between 1.1 and 1.5.

6. The process according to claim 1, wherein the bulk catalyst has at least in part a hexagonal structure characterized by an X-ray diffraction pattern having reasonably well resolved reflections in the range of about 33° to about 35° and about 59° to about 61° 2θ.

7. The process according to claim 6, wherein the main reflections in the X-ray diffraction pattern have a full width at half maximum (FWHM) less than 2.5.

8. A process according to any one of claims 1-5, 6, and 7, further comprising a step of hydrocracking a product produced from the hydroprocessing process.

9. A process according to any one of claims 1-5, 6, and 7, further comprising a step of desulfurization a product produced from the hydroprocessing process.

10. The process of claim 1, further comprising conducting a hydrocarbon product away from the process, the hydrocarbon product containing less nitrogen, less sulfur, or less sulfur and less nitrogen than the hydrocarbon feed.

11. The process of claim 10, wherein the feed is a hydrocarbon oil containing sulfur and nitrogen, with at least part of the sulfur and the nitrogen being in organically-bound form, and the hydrocarbon product contains less than 30 ppm sulphur.

12. The process of claim 10, further comprising forming a vapor product containing at least one of sulfur and nitrogen.

13. The process of claim 12, further comprising separating the vapor product from the hydrocarbon product and conducting the vapor product away from the process.

14. The process of claim 12, wherein the catalytic conversion conditions are hydrotreating conditions effective for converting at least a portion of organically bound sulfur and organically bound nitrogen into hydrogen sulfide and ammonia respectively.

15. The process of claim 14, further comprising at least one of (i) hydrocracking and (ii) hydrogenating the hydrocarbon product.

16. The process of claim 14, wherein the hydrocarbon product is conducted away from the process for storage and/or further processing.

17. The process of claim 16, further comprising using the hydrocarbon product to form at least one of (i) a fuel oil, (ii) a diesel oil, (iii) a lubricating oil, or (iv) a lubricating oil basestock.

18. The process of claim 1, wherein the cracking compounds comprise one or more soluble compounds containing phosphorus, fluorine, or both.

* * * * *